April 22, 1969
H. M. KIMBALL
3,439,764
POWER CASTER FOR MOVING TRAILERS
Filed July 3, 1967
Sheet 1 of 2
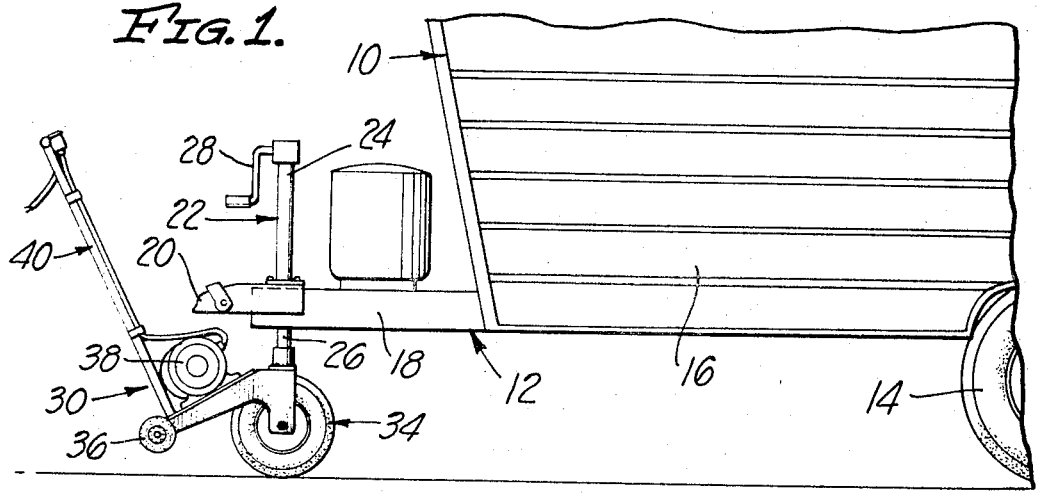
FIG.1.
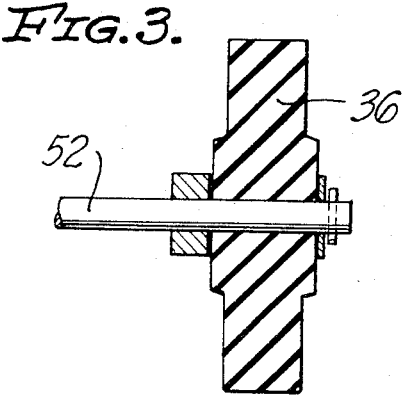
FIG.3.
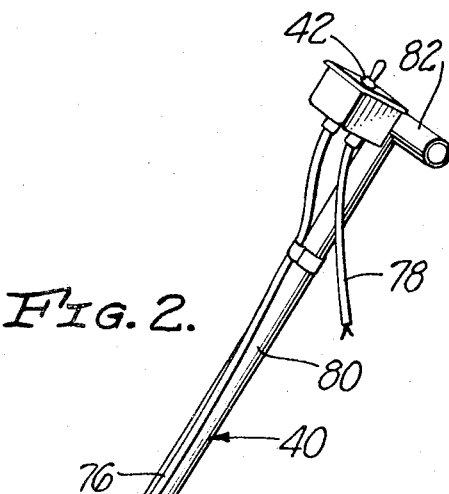
FIG.2.
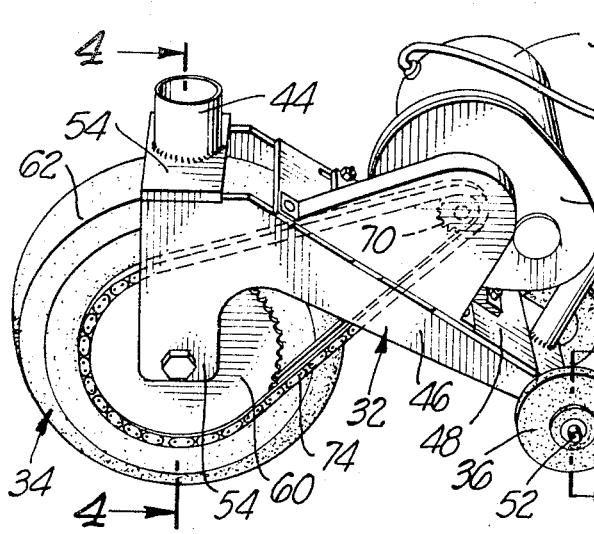
INVENTOR
HOWARD M. KIMBALL
BY
ATTORNEY April 22, 1969 H. M. KIMBALL 3,439,764
POWER CASTER FOR MOVING TRAILERS
Filed July 3, 1967 Sheet 2 of 2

INVENTOR
HOWARD M. KIMBALL
BY
*Ronard I. Brown*
ATTORNEY

United States Patent Office 3,439,764
Patented Apr. 22, 1969

3,439,764
POWER CASTER FOR MOVING TRAILERS
Howard M. Kimball, El Monte, Calif., assignor to Kimball and Stark, Inc., El Monte, Calif.
Filed July 3, 1967, Ser. No. 650,775
Int. Cl. B60k 7/00; B60p 3/06
U.S. Cl. 180—12     6 Claims

ABSTRACT OF THE DISCLOSURE

A power caster for moving travel trailers and the like having a hitch tongue for attaching the trailers to a towing vehicle and mounting a jack with a lower telescoping tube, the power caster having a frame mounting a rear, relatively large driving wheel, a coupling sleeve on the frame directly over the wheel for rotatably receiving the lower end of the telescoping jack tube on the trailer to support the front end of the trailer, a motor for driving the wheel to move the trailer, a steering handle attached to the frame for steering the power caster to maneuver the trailer, and a pair of relatively small auxiliary wheels mounted on the front end of the frame which are elevated out of contact with the ground when the power caster is attached to the trailer and about which the power caster, when detached from the trailer, may be rocked by means of the steering handle to elevate the driving wheel out of contact with the ground and thereby permit rolling of the power caster along the ground on the auxiliary wheels.

---

This invention relates generally to travel trailer aids. More particularly, the invention relates to a power caster for moving and maneuvering a travel trailer by hand.

Travel trailers provide an extremely popular form of living accommodations for vacation and other recreational travel. The use of such trailers, however, does present certain problems which detract from their enjoyment. One of these problems involves parking such a trailer. Thus, when parking a trailer, it is often desirable or necessary to maneuver the trailer without the aid of its towing vehicle. To this end, a travel trailer is commonly equipped with a front swivel or caster wheel which is mounted on the lower telescoping tube of a jack attached to the front hitch tongue of the trailer. When the trailer is being towed, this front caster wheel is either elevated out of contact with the ground or is removed from the jack. When parking the trailer, the jack is lowered to bring the caster wheel into supporting contact with the ground. In the event it is desirable or necessary to maneuver the trailer by hand, without the aid of its towing vehicle, the trailer hitch is uncoupled to release the trailer from the vehicle. The trailer is then supported entirely by its main wheels and the front caster wheel. The trailer may then be maneuvered into a desired parking position by pushing and/or pulling on the trailer in such a way as to roll the trailer on its main wheels and caster wheel. This method of maneuvering a trailer, however, is obviously very laborious, difficult, and time consuming. Moreover, the trailer cannot be maneuvered, at least without extreme difficulty and perhaps serious consequences, by persons afflicted with physical disorders, such as heart disease.

It is a principal object of this invention to provide a power caster for moving and maneuvering travel trailers and the like which avoids the above noted and other problems attendant to the existing methods of maneuvering such trailers by hand.

Another object of the invention is to provide a power caster of the character described which is simple to install on and remove from a trailer and may be easily moved about and transported when not in use.

A further object of the invention is to provide a power caster of the character described which is relatively simple in construction, economical to manufacture, easy to use, and otherwise ideally suited to its intended purposes.

Other objects, features and advantages of the present invention will become apparent to those versed in the art from a consideration of the following description, the appended claims and the accompanying drawings, wherein:

FIGURE 1 is a side elevation of a power caster according to the invention installed in operative position on a travel trailer;

FIGURE 2 is an enlarged perspective view of the power caster;

FIGURE 3 is an enlarged section taken on line 3—3 in FIGURE 2; and

Figure 4:
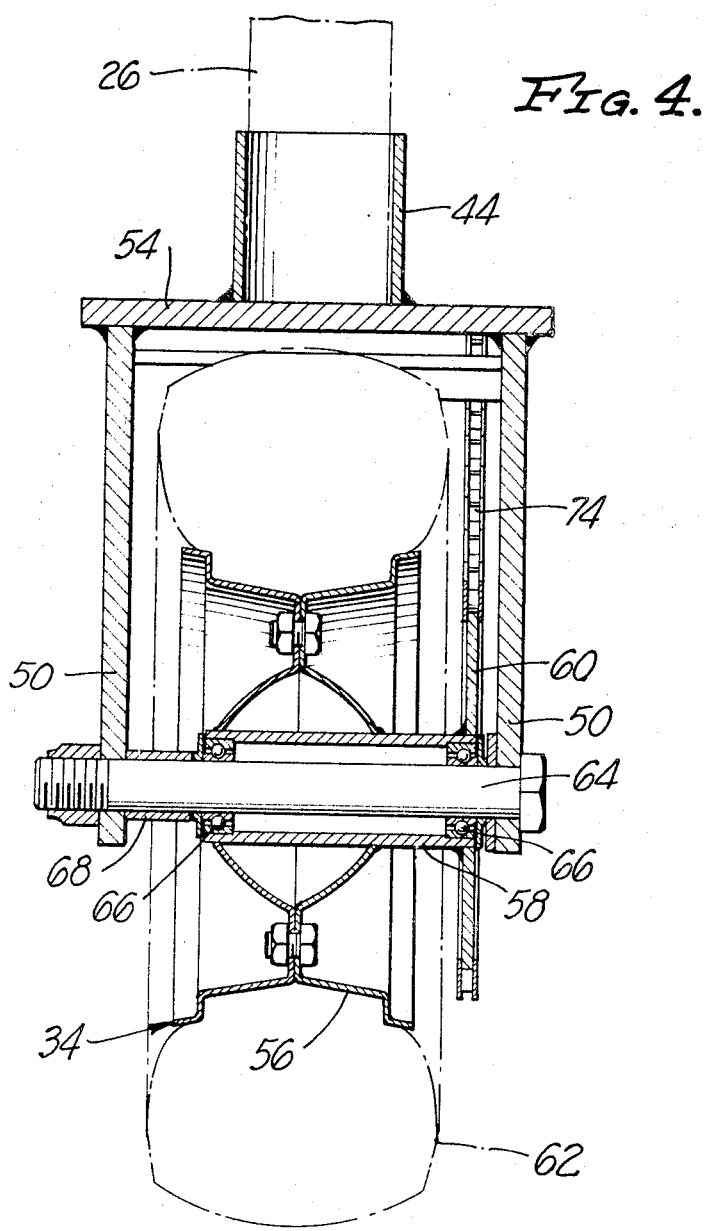
FIGURE 4 is an enlarged section taken on line 4—4 in FIGURE 2.

Referring now to these drawings, and particularly to FIGURE 1, there is illustrated a typical travel trailer 10 including a frame 12 supported intermediate its ends on main ground wheels 14 and mounting a trailer body or coach 16. The front end of the frame extends forwardly a distance beyond the front end of the coach to form a hitch tongue 18. At the front end of this tongue is a hitch member 20 adapted for connection to a mating hitch member on a towing vehicle (not shown) to provide a swivel connection between the trailer and vehicle. The hitch tongue 18 carries a jack 22 including a fixed upper tube 24 and a telescoping lower tube 26. This lower tube may be retracted upwardly into and extended downwardly from the upper tube by rotation of a crank 28 on the upper end of the jack. Normally, a swivel wheel or caster (not shown) is mounted on the lower end of the lower tube. This caster wheel may be lowered into supporting contact with the ground by rotation of the crank 28 in a direction to extend the lower jack tube. When thus lowered, the trailer is supported on the main wheels 14 and the front caster wheel in such a way that the trailer may be moved and maneuvered by hand to a desired parking position by pushing and/or pulling on the trailer. As noted earlier, however, this method of moving and maneuvering a trailer is extremely laborious, difficult, and time consuming and may be hazardous to persons afflicted with physical disorders, such as heart disease.

According to the present invention, the front caster wheel of the trailer is replaced, when maneuvering the trailer by a power caster 30. This power caster has a frame 32 mounting a rear load bearing, driving wheel 34 and a pair of auxiliary front wheels 36. The rear driving wheel 34 is driven by a reversible motor 38 on the frame. Attached to the front end of the frame is a steering handle 40 mounting a switch 42 for controlling the motor. The caster frame 32 mounts a coupling sleeve 44 directly over the rear driving wheel 34 for rotatably receiving the lower end of the telescoping jack tube 26 in the manner illustrated in FIGURE 1.

Briefly, in use of the power caster 30, the latter is installed under the trailer hitch tongue 18 with the lower end of the lower jack tube 26 fitting within the caster coupling sleeve 44. The front caster wheels 36 are elevated out of supporting contact with the ground when the power caster is thus installed. The caster motor 38 is then energized by actuation of the motor switch 42 to drive the driving wheel 34 and thereby move the trailer 10 forwardly or rearwardly, depending upon the position of the switch. Simultaneously, the power caster may be steered by the handle 40 to maneuver the trailer. When detached from the trailer, the power caster may be rotated about the front auxiliary wheels 36 to elevate the driving wheel 34 out of contact with the ground and thereby permit rolling of the power caster along the ground on its auxiliary wheels.

Referring now in more detail to the illustrated power caster 30 of the invention which has been selected for illustration in the drawings, the caster frame 32 has a forwardly sloping midsection 46 with an upper mounting plate 48. Depending from the upper rear end of the frame 32 are a pair of fork arms 50 which straddle the caster driving wheel 34. These arms are secured to the driving wheel in the manner explained below. Extending laterally through the lower front end of the frame is an axle 52, the ends of which project a distance beyond the sides of the frame. The front auxiliary wheels 36 are rotatably mounted on the outboard ends of this axle in the manner best shown in FIGURE 3. At the upper rear end of the frame, directly over the fork arms 50, is a load bearing cross plate 54 to which the coupling sleeve 44 is welded or otherwise rigidly secured.

Turning now to FIGURE 4, the rear driving wheel 34 will be seen to comprise a central hub 56. This hub may be fabricated from similar sheet metal stampings joined to one another by bolts, as shown. Extending centrally through and welded to the hub 56 is a tube 58. One end of this tube projects beyond one side of the hub to receive a coaxial sprocket 60. Sprocket 60 is welded to the tube. Hub 56 mounts a pneumatic tire 62. As already noted, and shown in FIGURE 4, the driving wheel 34 is located between the caster frame fork arms 50. Extending through the arms 50 and the central wheel tube 58 is a bolt or axle 64. The driving wheel is supported on the axle 64 by ball bearing units 66 which are fixed within the wheel tube 58. Surrounding the axle between the end of the wheel tube 58 opposite the sprocket 60 and the adjacent frame fork arm 50 is a spacer sleeve 68.

It is significant to note here that the coupling sleeve 44 is mounted directly over the driving wheel 34 with the sleeve axis approximately intersecting the wheel axis at right angles. The front auxiliary wheels 36 are relatively small and, as may be best observed in FIGURE 1, are located some distance above a plane of tangency to the underside of the driving wheel normal to the coupling sleeve axis. The reason for this particular tricycle wheel arrangement will appear presently.

The power caster drive motor 38 is mounted on the sloping caster frame plate 48. Motor 38 drives a sprocket 70 through a speed reducer 72. Trained about the sprockets 60, 70 is a drive chain 74. It is now evident, therefore, that the motor 38 drives the driving wheel 34 at a reduced speed and increased torque through the speed reducer 72. As already noted, motor 38 is reversible and is controlled by a switch 42 on the steering handle 40. This switch may be actuated to de-energize the motor and to energize the motor in either direction, and thereby drive the caster wheel 34 in either direction. The motor is connected to the switch by an electrical cable 76. Extending from the switch is a cable 78 for connection to an electrical power source, such as a conventional wall receptacle.

The steering handle 40 on which the motor switch 42 is mounted has a long tubular section or shaft 80 which is rigidly joined at its lower end to the front end of the caster frame 32. This handle shaft extends generally normal to the sloping midsection 46 of the frame. Rigidly joined to the upper end of the shaft is a cross tube or handgrip 82. The motor switch 42 is secured to the center of the handgrip so as to be conveniently accessible to the operator.

In use of the power caster 30, the lower trailer jack tube 26 is initially lowered to bring the caster wheel (not shown) which is commonly mounted on the tube into supporting contact with the ground. The jack is adjusted to locate the front trailer hitch tongue 18 at an elevation such as to accommodate the power caster in the position of FIGURE 1. At this point, blocks or other means are placed up to trailer frame 12 to support the hitch tongue in its elevated position. The trailer jack is then raised and now maneuvered to position under the jack. After the power caster is properly located, the lower jack tube 26 is again lowered to first engage the lower end of the tube in the power caster coupling sleeve 44 and then raise the hitch tongue off of the blocks on which the tongue is presently supported. At this point, the trailer is supported by its main load wheels 14 and the driving wheel 34 of the power caster. Accordingly, the trailer may be moved and maneuvered by actuating the switch 42 to energize the power caster motor 38 for driving the caster wheel 34 in one direction or the other. The trailer is maneuvered by steering the power caster with the aid of its steering handle 40.

It will be observed in FIGURE 1 that because of the earlier described tricycle wheel arrangement of the power caster, the auxiliary caster wheels 36 are elevated out of contact with the ground when the power caster is installed in operating position on a trailer. This renders the power caster easy to steer and maneuver. When the power caster is removed from the trailer, however, all three caster wheels engage the ground, as shown in FIGURE 2, to support the caster in an upright position of rest. The power caster, when detached from the trailer, is moved from one place to another by rocking the caster forwardly about its auxiliary wheels 36 to raise the driving wheel 34 off the ground and then rolling the caster on its front auxiliary wheels.

It is now evident, therefore, that the invention herein described and illustrated is fully capable of attaining the several objects and advantages preliminarily set forth.

The inventor claims:

1. A power caster for moving a trailer having a hitch tongue comprising:
    a frame,
    a single driving wheel on said frame,
    coupling means on said frame directly over and in the plane of said driving wheel adapted to be placed in supporting relation to said hitch tongue to support the front end of the trailer in an elevated position,
    said frame including a motor mount below the level of said coupling means and offset from said coupling means and wheel,
    a motor attached to said mount so as to clear the underside of said hitch tongue, and means drivably connecting said motor and wheel for driving said wheel, thereby to move said trailer,
    a steering handle attached to and rising from said frame by which said power caster may be steered to maneuver said trailer, and
    switch means on said handle for controlling said motor, 2. A power caster according to claim 1 wherein:
    said motor mount comprises a mounting plate laterally offset from and disposed in a plane generally parallel to the axis of said driving wheel,
    said motor is mounted on said plate with the motor axis parallel to said wheel axis, and
    said connecting means comprises a speed reduction drive between the motor shaft and said drive wheel.

3. A power caster for moving a trailer having a hitch tongue comprising:
    an elongate frame including a steering handle,
    driving wheel means on said frame,
    coupling means on said frame for attachment to said hitch tongue,
    power means for driving said wheel means to move the trailer,
    auxiliary wheel means rotatably mounted on said frame at a position spaced longitudinally of the frame from said drive wheel means in such a way that said auxiliary wheel means are elevated out of contact with the ground when said power caster is attached to said trailer, and
    said power caster when detached from said trailer being adapted to be rocked about said auxiliary wheel means out of contact with the ground and thereby permit said power caster to be rolled on said auxiliary wheel means.

4. A power caster according to claim 3 wherein:
said steering handle is rigidly secured to and extends upwardly at an angle from the end of said frame adjacent said auxiliary wheel means in such manner that said power caster may be rocked on said auxiliary wheel means to elevate said driving wheel means out of contact with the ground by pulling laterally on said handle.

5. A power caster according to claim 3 wherein:
said trailer hitch tongue mounts a jack including a lower telescoping tube,
said coupling means comprise a coupling sleeve over said driving wheel means for rotatably receiving the lower end of said jack tube,
the axis of said coupling sleeve approximately intersects the axis of said driving wheel means, and
said auxiliary wheel means are located above a plane of tangency to the underside of said driving wheel means normal to said coupling sleeve axis, whereby said auxiliary wheel means are elevated out of contact with the ground when said power caster is installed in operative position on said trailer with said lower jack tube engaging in said coupling sleeve.

6. A power caster according to claim 3 wherein:
said power means comprise a motor mounted directly on said frame between said wheel means, and speed reduction means drivably coupling said motor and driving wheel means, and
said motor rotates toward a position over said auxiliary wheel means when said power caster is rocked about said auxiliary wheel means to elevate said drive wheel means out of contact with the ground.

References Cited

UNITED STATES PATENTS

| | | | |
|---|---|---|---|
| 1,740,404 | 12/1929 | Kalberer | 280—46 |
| 2,491,824 | 12/1949 | McKee. | |
| 2,725,946 | 12/1955 | Welter | 180—65 X |
| 2,812,951 | 11/1957 | Hanson | 280—46 |
| 3,156,315 | 11/1964 | Hawgood | 180—13 |
| 3,183,013 | 5/1965 | Brown | 280—46 |
| 3,356,172 | 12/1967 | Peckham et al. | 180—19 |

KENNETH H. BETTS, *Primary Examiner.*

U.S. Cl. X.R.

180—19, 65; 280—46